United States Patent
Lan et al.

(10) Patent No.: US 12,359,281 B2
(45) Date of Patent: Jul. 15, 2025

(54) METHOD AND EQUIPMENT FOR COMPREHENSIVE UTILIZATION OF NIOBITE

(71) Applicant: UNIVERSITY OF SCIENCE AND TECHNOLOGY BEIJING, Beijing (CN)

(72) Inventors: Xi Lan, Beijing (CN); Zhancheng Guo, Beijing (CN); Jintao Gao, Beijing (CN); Zengwu Wang, Beijing (CN); Guoliang Feng, Beijing (CN); Xiang Li, Beijing (CN); Rong Yuan, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 18/061,998

(22) Filed: Dec. 5, 2022

(65) Prior Publication Data
US 2023/0407437 A1    Dec. 21, 2023

(30) Foreign Application Priority Data

Jun. 17, 2022  (CN) .......................... 202210684957.7

(51) Int. Cl.
C22B 34/24    (2006.01)
C22B 5/10     (2006.01)

(52) U.S. Cl.
CPC ................ *C22B 34/24* (2013.01); *C22B 5/10* (2013.01)

(58) Field of Classification Search
CPC ......... C22B 34/00; C22B 34/20; C22B 34/24; C22B 5/00; C22B 5/10
See application file for complete search history.

(56) References Cited

FOREIGN PATENT DOCUMENTS

| CN | 104498737 A | * | 4/2015 |
| CN | 105907990 A |   | 8/2016 |
| CN | 108165756 A |   | 6/2018 |

(Continued)

OTHER PUBLICATIONS

CN 108165756 A machine translation, original document published Jun. 15, 2018, translated Jan. 24, 2024 (Year: 2018).*

(Continued)

*Primary Examiner* — Keith D. Hendricks
*Assistant Examiner* — Nikolas Takuya Pullen

(57) ABSTRACT

A method and an equipment for comprehensive utilization of niobite is disclosed. The method includes the following steps: S1. adding and uniformly mixing a coal-based reducing agent to the niobite, and subsequently reducing the mixture in a reduction furnace to obtain the selective reduction product; S2. adding the selective reduction product to a super-gravity reactor where the ambient temperature is controlled to be lower than the temperature at which the niobium oxide is reduced; driven by super-gravity, reverse migrating and collecting the metal iron and the niobium-rich slag at different locations in the reactor; discharging the metallic iron tightly attached to the wall of the reactor through an iron discharging port, and discharging the niobium-rich slag enriched to the inner layer of the reactor through a slag discharging port, so that the separation of the metallic iron and the niobium-rich slag is realized in the super-gravity field.

2 Claims, 4 Drawing Sheets

(56) References Cited

FOREIGN PATENT DOCUMENTS

| | | | | |
|---|---|---|---|---|
| CN | 106148736 B | * | 2/2019 | ............... C22B 4/08 |
| CN | 112322890 A | * | 2/2021 | ........... C21B 13/006 |

OTHER PUBLICATIONS

CN 105907990 A machine translation, original document published Aug. 31, 2016, translated Jan. 24, 2024 (Year: 2016).*

Sun Linquan, Wang Lina, Yu Hongdong, Su Hui, Chen Desheng, Qi Tao, 2021, CIESC Journal 2021, 72(4) p. 1847-1862 (Year: 2021).*

First Examination Report and Search Report of CNIPA, Jul. 29, 2022 A niobium iron ore integrated utilization process and apparatus Application No. 202210684957.7 Pekyoto University.

Notice of Allowance from CNIPA and Allowed Claims, Aug. 6, 2022 A niobium iron ore integrated utilization process and apparatus Application No. 202210684957.7 Pekyoto University.

Li Chun-long, et al., "Technology Development and Industrialization of Resources Comprehensive Utilization of Intergrowth and Associated Ore in Baiyun Obo," Chinese Rare Earths, 2015, vol. 36, No. 5: 151-158.

* cited by examiner

METHOD AND EQUIPMENT FOR COMPREHENSIVE UTILIZATION OF NIOBITE

CROSS REFERENCE TO RELATED APPLICATIONS

The present application claims priority to Chinese Patent Application No. 202210684957.7, entitled "Method and Equipment for Comprehensive Utilization of Niobite," filed Jun. 17, 2022, in the China National Intellectual Property Administration (CNIPA), the entire of which is hereby incorporated in its entirety by reference.

FIELD OF THE DISCLOSURE

The invention relates to the technical field of efficient utilization of mineral resources, in particular to a method and equipment for comprehensive utilization of niobite.

BACKGROUND OF THE DISCLOSURE

Because of the characteristics of high temperature resistance, corrosion resistance, and excellent superconductivity, the rare metal niobium is widely applied in many important fields, such as steel, aerospace, advanced materials, nuclear industry and so on, and becomes an indispensable key strategic metal in modern industry. In recent years, with the rapid development of steel production, the demand for metals and compounds of niobium has increased rapidly in the fields of alloy steel and chemical industry. The Bayan Obo mine area in China is the second largest niobium ore resource base in the world, and the niobium storage of the medium-lean oxide ore in the main east ore body reaches 120 million tons. However, the niobite in Bayan Obo mine have the characteristics of low grade, complex distribution and difficult decomposition, so that the development and utilization of niobite is extremely difficult. Therefore, the production of niobium metal, niobium-containing alloy steel and niobium compounds in many countries is not much, far from meeting the needs of national economic development, and still relies heavily on imports, with an external dependence of more than 95%. Meanwhile, the uneven distribution of niobium resources in the world causes a high monopoly of the market, and the price is completely determined by the great head of foreign industry giants, which will seriously affect the national economy and national defense security if the international situation changes significantly. Therefore, solving the problem of niobium resource recycling and ensuring the safe supply of niobium resources has become an urgent task for the researchers.

For the smelting and utilization of characteristic niobium resources such as the Bayan Obo low-grade niobite, a great deal of research and practice is carried out by domestic and foreign metallurgists, which mainly includes two research directions of pyrometallurgy and hydrometallurgy methods from the available information. The pyrometallurgical process is to carry out high-temperature reduction smelting on the niobite to prepare a ferro-niobium product; the wet process adopts high-concentration (70%) hydrofluoric acid or hydrofluoric acid-concentrated sulfuric acid to decompose minerals, and then the minerals are subjected to post-treatment such as extraction separation, washing, drying, and roasting to produce niobium oxide and other products. The wet process has great difficulty in being applied to low-grade niobium resources due to the problems of serious equipment corrosion, acid and alkali volatilization, large environmental burden, and low-grade mineral decomposition rate. Relatively speaking, the pyrometallurgical process has higher maturity and efficiency, and has great advantages and application development prospects in the aspect of processing large-batch low-grade niobite resources. However, in the existing pyrometallurgical process, the niobite is subjected to one-step reduction melting at high temperature, so that the metallization rate of reduced iron is not high, and part of niobium element is reduced to molten iron, thereby affecting the yield of niobium.

SUMMARY OF THE DISCLOSURE

The main purpose of the invention is to propose a method and equipment for comprehensive utilization of niobite. With the great advantage of super-gravity in strengthening interphase separation, the super-gravity field was introduced for the first time into the separation process of metallic iron and niobium-rich slag of niobite reduction product, thus achieving a complete separation of slag and iron at a temperature lower than that at which the niobium oxide was reduced, reducing the reduction of niobium and its dissolution into the metallic iron and obtaining high-grade metallic iron and niobium-rich slag.

To solve the above technical problems, the invention provides the following technical solutions according to one hand of this invention:

The method for comprehensive utilization of niobite includes the following steps:

S1. A coal-based reducing agent is added to the niobite and uniformly mixed, and the mixture is subsequently reduced in a reduction furnace to obtain the selective reduction product.

S2. The selective reduction product is added to a super-gravity reactor where the ambient temperature is controlled to be lower than the temperature at which the niobium oxide is reduced. Driven by super-gravity, the metal iron and the niobium-rich slag are reverse migrated and collected at different locations in the reactor. The metallic iron tightly attached to the wall of the reactor is discharged through an iron discharging port, and the niobium-rich slag enriched to the inner layer of the reactor is discharged through a slag discharging port, so that the separation of the metallic iron and the niobium-rich slag is realized in the super-gravity field.

As a preferred embodiment of the method for comprehensive utilization of niobite as described in the present invention, the niobium content of the niobite in step S1 is 0.7-1.3 wt. %, which is obtained by beneficiation of the Bayan Obo ore.

As a preferred embodiment of the method for comprehensive utilization of niobite as described in the present invention, the reduction temperature of the reduction furnace in step S1 is 950-1250° C.

As a preferred embodiment of the method for comprehensive utilization of niobite as described in the present invention, the coal-based reducing agent in step S1 is added in a ratio of 1.0 to 1.5, the C/O ratio is the atomic percentage of the carbon content in the coal-based reducing agent and the oxygen content of the iron oxide in niobite.

As a preferred embodiment of the method for comprehensive utilization of niobite as described in the present invention, the ambient temperature in the super-gravity reactor in step S2 is 1200-1250° C.

As a preferred embodiment of the method for comprehensive utilization of niobite as described in the present invention, the gravity coefficient of the super-gravity in step S2 is 400-1000 g.

As a preferred embodiment of the method for comprehensive utilization of niobite as described in the present invention, the action time of super-gravity in step S2 is 5-10 min.

To solve the above technical problems, the invention provides the following technical solutions according to the other hand of this invention:

The apparatus for the comprehensive utilization of niobite includes the following components:

A reduction furnace (4), a diversion system (5), a super-gravity reactor (7), an iron collecting tank (9), a slag collecting tank (10), a speed regulating motor (13) a super-gravity control system (15). The reduction furnace (4) and the super-gravity reactor (7) are connected through the diversion system (5), the iron collecting tank (9) and the slag collecting tank (10) are respectively positioned at the lower parts of the iron discharging port and the slag discharging port of the super-gravity reactor (7), the speed regulating motor (13) is electrically connected with the super-gravity control system (15).

As a preferred embodiment of the apparatus for comprehensive utilization of niobite as described in the present invention, its components also include: a thermocouple (6) and a heater (8).

As a preferred embodiment of the apparatus for comprehensive utilization of niobite as described in the present invention, its components also include: a beneficiation system (1), a supporting system (11), a power supply and temperature control system (12) and a transmission shaft (14).

The invention has the following beneficial effects:

The invention provides a method and equipment for comprehensive utilization of niobite. First, the selective reduction of niobium and iron was achieved in the reduction furnace depending on the difference in reduction temperatures of iron and niobium oxides. Subsequently, the metallic iron and niobium-rich slag were driven by super-gravity in a super-gravity reactor to reverse migration and aggregate separately, thus achieving a complete separation of slag and iron at a temperature lower than that at which the niobium oxide was reduced, reducing the reduction of niobium and its dissolution into the metallic iron and obtaining high-grade metallic iron and niobium-rich slag, which provides a new process technical route for utilizing niobium resources in the low-grade niobite of Bayan Obo, with simple operation, low cost and continuous production.

BRIEF DESCRIPTION OF DRAWINGS

In order to clearly illustrate the embodiments or technical solutions of the invention, the drawings are briefly described below. It is obvious that the drawings in the following description are only some embodiments of the present invention, and other drawings can be obtained for those skilled in the art according to the structures shown in the drawings without creative efforts.

In FIG. 3, (a) is a macroscopic view of the separated samples in Embodiment 2; (b) is an SEM picture of separated niobium-rich slag in Embodiment 2; and (c) is a SEM picture of separated metallic iron in Embodiment 2.

Figure 1:
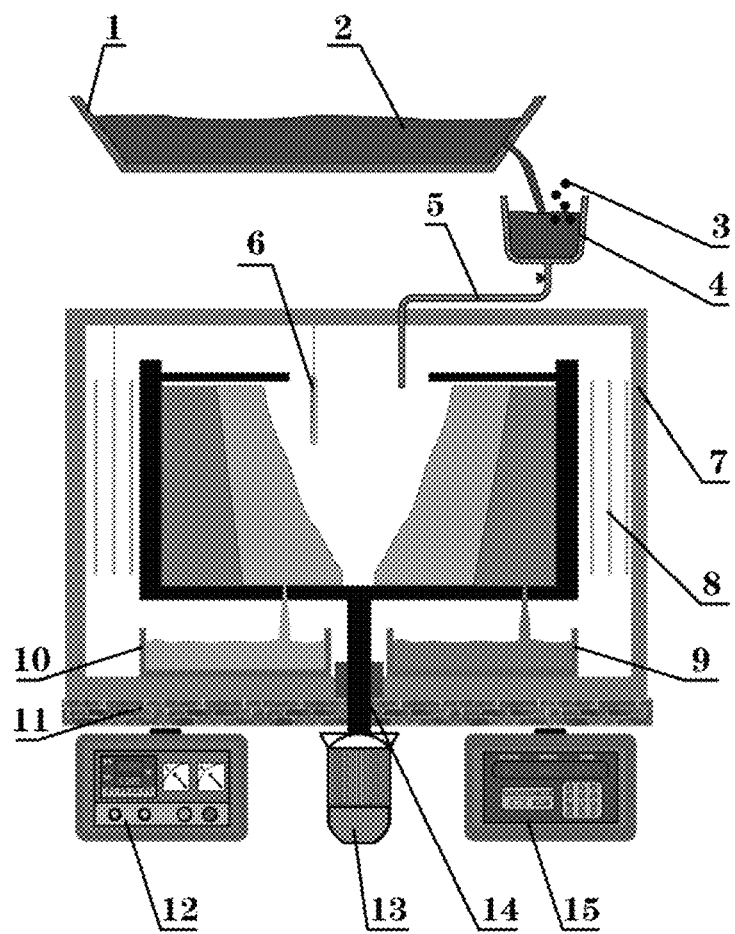
FIG. 1 shows the apparatus for comprehensive utilization of niobite applied in the invention.

In the drawings: 1—beneficiation system, 2—niobite, 3—carbon powder, 4—reduction furnace, 5—diversion system, 6—thermocouple, 7—supergravity reactor, 8—heater, 9—iron collecting tank, 10—slag collecting tank, 11—supporting system, 12—power supply and temperature control system, 13—speed regulating motor, 14—transmission shaft, 15—supergravity control system, 21—metallic iron and 22—niobium-rich slag.

The implementation, functional features and advantages of the objects of the present invention will be further explained with reference to the accompanying drawings.

DETAILED DESCRIPTION OF THE DISCLOSURE

The technical solutions in the following will be described clearly and completely in connection with the embodiments, and it is obvious that the described embodiments are only a part of the present invention, and not all of them. Based on the examples of embodiments in the invention, which can be derived by a person skilled in the art from the embodiments given herein without making any creative effort, shall fall within the protection scope of the present invention.

The invention provides a method and equipment for comprehensive utilization of niobite, and a new process technical route for utilizing niobium resources in the low-grade niobite of Bayan Obo, with simple operation, low cost and continuous production. First, the selective reduction of niobium and iron was achieved in the reduction furnace depending on the difference in reduction temperatures of iron and niobium oxides. Subsequently, the metallic iron and niobium-rich slag were driven by super-gravity in a super-gravity reactor to reverse migration and aggregate separately, thus achieving a complete separation of slag and iron at a temperature lower than that at which the niobium oxide was reduced, reducing the reduction of niobium and its dissolution into the metallic iron and obtaining high-grade metallic iron and niobium-rich slag.

To solve the above technical problems, the invention provides the following technical solutions according to one hand of this invention:

The method for comprehensive utilization of niobite includes the following steps:

S1. A coal-based reducing agent is added to the niobite and uniformly mixed, and the mixture is subsequently reduced in a reduction furnace to obtain the selective reduction product.

S2. The selective reduction product is added to a super-gravity reactor where the ambient temperature is controlled to be lower than the temperature at which the niobium oxide is reduced. Driven by super-gravity, the metal iron and the niobium-rich slag are reverse migrated and collected at different locations in the reactor. The metallic iron tightly attached to the wall of the reactor is discharged through an iron discharging port, and the niobium-rich slag enriched to the inner layer of the reactor is discharged through a slag discharging port, so that the separation of the metallic iron and the niobium-rich slag is realized in the super-gravity field.

The niobium content of the niobite obtained by beneficiation of the Bayan Obo ore is 0.7-1.3 wt. %, and the niobium content herein is any one of but not limited to 0.8 wt %, 0.85 wt %, 0.9 wt %, 1.0 wt %, 1.1 wt %, 1.15 wt %, 1.2 wt %, 1.22 wt %, 1.3 wt %, or a range between any two.

As a preferred embodiment of the method for comprehensive utilization of niobite as described in the present invention, the reduction temperature of the reduction furnace in step S1 is 950-1250° C. This temperature range allows for the reduction of iron oxides, but not niobium oxides, where iron can be reduced from the oxides to metallic iron and niobium remains oxidized, achieving a preliminary separation of niobium and iron in the niobite. The reduction temperature of reduction furnace is not limited to any one of 950° C., 1000° C., 1050° C., 1080° C., 1100° C., 1120° C., 1150° C., 1200° C., 1250° C. or any range between the two. the holding time can be adjusted according to the actual situation in order to achieve sufficient reduction of iron oxides.

As a preferred embodiment of the method for comprehensive utilization of niobite as described in the present invention, the coal-based reducing agent in step S1 is added in a ratio of 1.0 to 1.5, the C/O ratio is the atomic percentage of the carbon content in the coal-based reducing agent and the oxygen content of the iron oxide in niobite. The coal-based reducing agent is added in excess to ensure adequate reduction of the iron oxides, the C/O ratio is not limited to any one of 1.0, 1.07, 1.1, 1.2, 1.26, 1.3, 1.37, 1.4, 1.45, 1.5, or any range between the two. And the type of coal-based reducing agent is not limited to any one or any number of coal powder, graphite powder, coke powder, biomass carbon powder, etc.

As a preferred embodiment of the method for comprehensive utilization of niobite as described in the present invention, the ambient temperature in the super-gravity reactor in step S2 is 1200-1250° C. This temperature range is lower than the temperature conditions under which the niobium oxide is reduced, avoiding the reduction of the niobium oxide, while the metallic iron and the niobium-rich slag are in a liquid state, facilitating the liquid-liquid separation between them. The ambient temperature in the super-gravity reactor is any one of but not limited to 1200° C., 1210° C., 1220° C., 1230° C., 1240° C., 1250° C., or any range between them.

As a preferred embodiment of the method for comprehensive utilization of niobite as described in the present invention, the centrifugal rotation system is turned on after controlling the ambient temperature inside the super-gravity reactor, and the supergravity reactor is driven by an electric motor to rotate at high speed in the horizontal direction, generating a horizontal outward super-gravity field.

As a preferred embodiment of the method for comprehensive utilization of niobite as described in the present invention, the gravity coefficient of the super-gravity in step S2 is 400-1000 g. The gravity coefficient of super-gravity can be adjusted as needed and can be but not limited to any one of 400 g, 500 g, 600 g, 700 g, 800 g, 900 g, 1000 g or a range between any two.

As a preferred embodiment of the method for comprehensive utilization of niobite as described in the present invention, the action time of super-gravity in step S2 is 5-10 min. The drive time of super-gravity can be adjusted according to the amount of reaction material and can be but not limited to any one of 5 min, 6 min, 7 min, 8 min, 9 min, 10 min, or any range between the two.

To solve the above technical problems, the invention provides the following technical solutions according to the other hand of this invention:

The apparatus for the comprehensive utilization of niobite includes the following components:

A reduction furnace (4), a diversion system (5), a super-gravity reactor (7), an iron collecting tank (9), a slag collecting tank (10), a speed regulating motor (13) a super-gravity control system (15). The reduction furnace (4) and the super-gravity reactor (7) are connected through the diversion system (5), the iron collecting tank (9) and the slag collecting tank (10) are respectively positioned at the lower parts of the iron discharging port and the slag discharging port of the super-gravity reactor (7), the speed regulating motor (13) is electrically connected with the super-gravity control system (15).

Its components also include: a thermocouple (6) and a heater (8), a beneficiation system (1), a supporting system (11), a power supply and temperature control system (12) and a transmission shaft (14).

Wherein, the Bayan Obo iron-rare earth-niobium symbiotic ore is processed by the beneficiation system (1) to obtain the selected niobite (2), and the niobite is reduced by adding carbon powder (3) in the process of entering a selective reduction furnace (4) for reduction; then, the reducing product continuously enters a super-gravity reactor (7) through a diversion system (5). A heating body (8) arranged on the outer side of the super-gravity high-temperature reactor (7) is connected with a thermocouple (6) on a power supply and temperature control system (12) for heating and controlling the temperature of the supergravity high-temperature reactor (7); the supergravity control system (15) is electrically connected with the speed regulating motor (13) through a transmission shaft (14) for controlling the rotating speed of the super-gravity high-temperature reactor (7); the high gravity generated by centrifugal rotation drives the metallic iron to be enriched to be tightly attached to the furnace wall, and the metallic iron is continuously discharged through the iron collecting tank (9), while the niobium-rich slag is enriched to the inner layer of the reactor and is collected through the slag collecting tank (10), thereby realizing the separation between the metallic iron and the niobium-rich slag.

Embodiment 1

The comprehensive utilization method of the niobite with the niobium content of 1.17 wt % comprises the following steps:

S1, 200 kg of niobite containing 1.17 wt % of niobium was firstly mixed with coal powder with a C/O ratio of 1.0 into the niobite, and then the mixture was heated to 1050° C. in a reduction furnace and hold for 120 min to obtain the selective reduction product.

Figure 2:
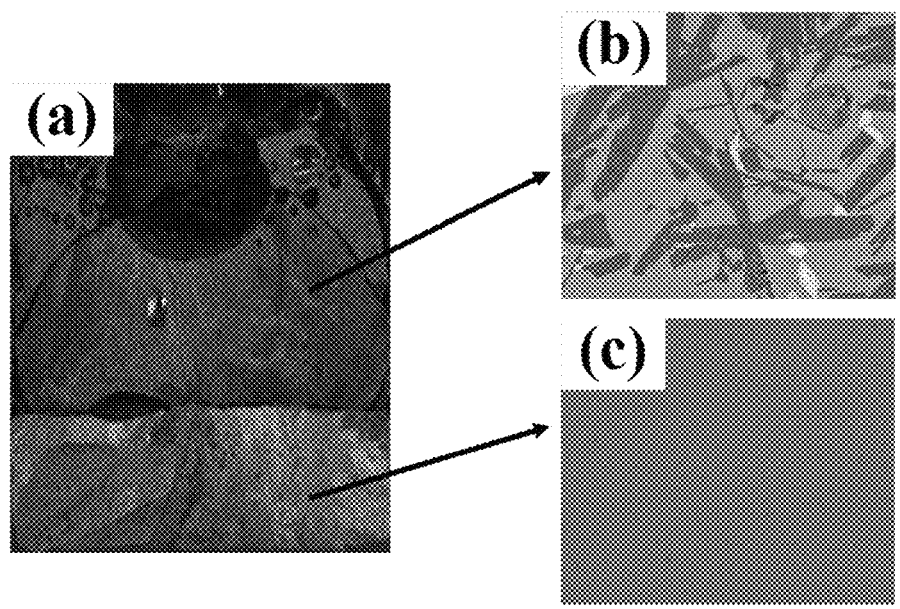
FIG. 2 shows the morphological view of the product in Embodiment 1 In FIG. 2, (a) is a macroscopic view of the separated samples in Embodiment 1; (b) is an SEM picture of the separated niobium-rich slag in Embodiment 1; and (c) is a SEM picture of separated metallic iron in Embodiment 1.

S2, the selective reduction product was added into a super-gravity reactor through a diversion system, and the ambient temperature of the reactor was controlled to be constant at 1200° C. and then the centrifugal rotating system was turned on, and the super-gravity reactor was driven by an electric motor to rotate at high speed in the horizontal direction, generating a horizontal outward supergravity field. The metallic iron and the niobium-rich slag were driven by super-gravity to migrate in the opposite directions and aggregate separately, and the gravity coefficient was controlled to be 600 g and the driving time to be 5 min. After the super-gravity separation was completed, the motor was turned off and the samples were taken out for analysis. The macroscopic and microscopic morphology of the samples are shown in FIG. 2. It can be seen that the low-temperature separation at 1200° C. of the metallic iron and the niobium-rich slag phase was achieved by adopting the super-gravity method, and the metallic iron was enriched to be close to the furnace wall of the reactor along the super-gravity direction, and the niobium-rich slag was enriched to the inner layer of the reactor along the reverse direction.

As shown in FIG. 2 (a), the chemical analysis on the separated metallic iron and niobium-rich slag were further performed respectively. The Fe content in the metallic iron phase reached 98.69% as shown in FIG. 2 (b), and the Nb content in the niobium-rich slag phase was 4.67% as shown in FIG. 2 (c), the Nb content in the niobium-rich slag was 3.99 times of that of the raw material. It can be seen that the complete separation of slag and iron was achieved by the combination of selective reduction and supergravity separation, at the temperature lower than that at which the niobium oxide was reduced, reducing the reduction of niobium and its dissolution into the metallic iron and obtaining high-grade metallic iron and niobium-rich slag.

Embodiment 2

The comprehensive utilization method of the niobite with the niobium content of 1.04 wt % comprises the following steps:

S1, 200 kg of niobite containing 1.04 wt % of niobium was firstly mixed with coal powder with a C/O ratio of 1.5 into the niobite, and then the mixture was heated to 1250° C. in a reduction furnace and hold for 80 min to obtain the selective reduction product.

Figure 3:
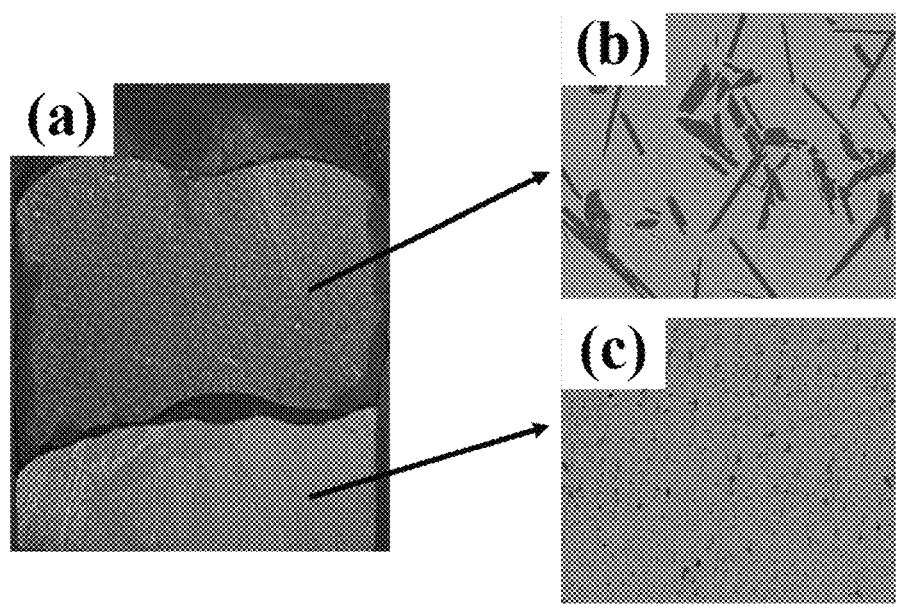
FIG. 3 shows the morphological view of the product in Embodiment 2.

S2, the selective reduction product was added into a super-gravity reactor through a diversion system, and the ambient temperature of the reactor was controlled to be constant at 1250° C. and then the centrifugal rotating system was turned on, and the super-gravity reactor was driven by an electric motor to rotate at high speed in the horizontal direction, generating a horizontal outward supergravity field. The metallic iron and the niobium-rich slag were driven by super-gravity to migrate in the opposite directions and aggregate separately, and the gravity coefficient was controlled to be 1000 g and the driving time to be 10 min. After the super-gravity separation was completed, the motor was turned off and the samples were taken out for analysis. The macroscopic and microscopic morphology of the samples are shown in FIG. 3. It can be seen that the low-temperature separation at 1250° C. of the metallic iron and the niobium-rich slag phase was achieved by adopting the super-gravity method, and the metallic iron was enriched to be close to the furnace wall of the reactor along the super-gravity direction, and the niobium-rich slag was enriched to the inner layer of the reactor along the reverse direction.

As shown in FIG. 3 (a), the chemical analysis on the separated metallic iron and niobium-rich slag were further performed respectively. The Fe content in the metallic iron phase reached 98.12% as shown in FIG. 3 (b), and the Nb content in the niobium-rich slag phase was 4.98% as shown in FIG. 3 (c), the Nb content in the niobium-rich slag was 4.79 times of that of the raw material. It can be seen that the complete separation of slag and iron was achieved by the combination of selective reduction and supergravity separation, at the temperature lower than that at which the niobium oxide was reduced, reducing the reduction of niobium and its dissolution into the metallic iron and obtaining high-grade metallic iron and niobium-rich slag.

Comparative Example 1

Figure 4:
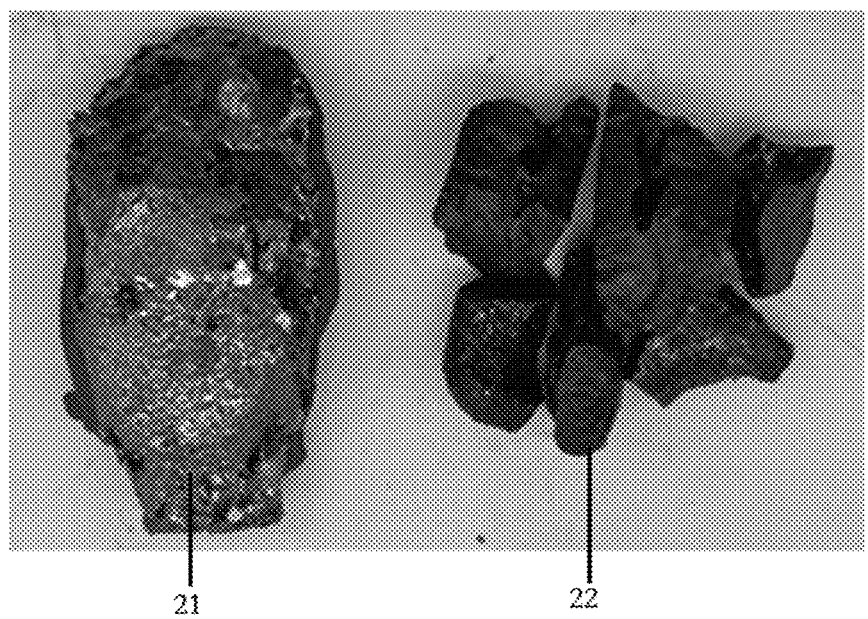
FIG. 4 shows the morphological view of the product in Comparative Example 1.

The difference from the Embodiment 1 is that a high-temperature melting and separating conventional process was adopted to separate the slag and the iron in step S2, the separation temperature was 1500° C., and the separation time was 30 min. The morphology of the separated product is shown in FIG. 4, and the chemical analysis was further performed on the separated metallic iron and the niobium-rich slag respectively. The content of Fe in the metallic iron phase was 78.46%, and the content of Nb in the niobium-rich slag phase was 1.89%. It can be seen that when the separation of slag and iron was achieved at high temperature, part of the niobium element was reduced to the iron, which greatly increased the loss of the niobium element and the niobium content in the obtained niobium-rich slag was only 1.6 times that of the raw material.

The following conclusions can be drawn from the above-mentioned embodiments and comparative example. The selective reduction of niobium and iron was firstly achieved in the reduction furnace depending on the difference in reduction temperatures of iron and niobium oxides in the invention. Subsequently, the metallic iron and niobium-rich slag were driven by super-gravity in a super-gravity reactor to reverse migration and aggregate separately, thus achieving a complete separation of slag and iron at a temperature lower than that at which the niobium oxide was reduced, reducing the reduction of niobium and its dissolution into the metallic iron and obtaining high-grade metallic iron and niobium-rich slag, which provides a new process technical route for utilizing niobium resources in the low-grade niobite of Bayan Obo, with simple operation, low cost and continuous production.

The above mentioned is only a preferred embodiment of the invention, not to limit the scope of the patent of the invention. Any equivalent structural transformation made by using the content of the specification of the invention under the inventive concept of the present invention, or directly/indirectly applied in other related technical fields are included in the scope of patent protection of the invention.

What is claimed is:

1. A method for comprehensive utilization of niobite with a niobium content of 1.17 wt %, comprising the following steps:

S1, mixing 200 kg of the niobite containing 1.17 wt % of the niobium with coal powder in a C/O ratio, wherein the C/O ratio is the atomic percentage ratio of a carbon content in the coal powder to an oxygen content of iron oxide in the niobite, of 1.0 to obtain a mixture, and then heating the mixture to 1050° C. in a reduction furnace and holding for 120 minutes to obtain a reduction product;

S2, adding the reduction product into a super-gravity reactor through a diversion system; an ambient temperature in the super-gravity reactor is 1200° C.; turning on a centrifugal rotating system, comprising driving the super-gravity reactor by an electric motor to rotate at high speed in a horizontal direction which generates a horizontal outward supergravity field; driving metallic iron and a niobium-rich slag by super-gravity to migrate in opposite directions and aggregate separately; controlling a gravity coefficient and a driving time to be 600 g and 5 minutes respectively; after the migration is completed, turning off the electric motor;

taking samples out for analysis; wherein a Fe content in the metallic iron phase is 98.69%; wherein a Nb content in the niobium-rich slag phase is 4.67%.

2. A method for comprehensive utilization of niobite with a niobium content of 1.04 wt %, comprising the following steps:

S1, mixing 200 kg of the niobite containing 1.04 wt % of the niobium with coal powder in a C/O ratio, wherein the C/O ratio is the atomic percentage ratio of a carbon content in the coal powder to an oxygen content of iron oxide in the niobite, of 1.5 to obtain a mixture, and then heating the mixture to 1250° C. in a reduction furnace and holding for 80 minutes to obtain a reduction product;

S2, adding the reduction product into a super-gravity reactor through a diversion system; an ambient temperature in the super-gravity reactor is 1250° C.; turning on a centrifugal rotating system, comprising driving the super-gravity reactor by an electric motor to rotate at high speed in a horizontal direction which generates a horizontal outward supergravity field; driving metallic iron and a niobium-rich slag by super-gravity to migrate in opposite directions and aggregate separately; controlling a gravity coefficient and a driving time to be 1000 g and 10 minutes respectively after the migration is completed, turning off the electric motor; taking samples out for analysis; wherein a Fe content in the metallic iron phase is 98.12%; wherein a Nb content in the niobium-rich slag phase is 4.98%.

* * * * *